United States Patent
Lee et al.

(10) Patent No.: US 11,192,492 B2
(45) Date of Patent: Dec. 7, 2021

(54) HEADLAMP LEVELLING SYSTEM HAVING A CONTROLLER GENERATING A CONTROL CODE BASED ON A SPEEDBUMP LOCATION, VEHICLE LOCATION AND VEHICLE SURFACE HEIGHT

(71) Applicant: HYUNDAI MOBIS CO., LTD., Seoul (KR)

(72) Inventors: Deuk Gyu Lee, Yongin-si (KR); Jun Young Sung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/101,818

(22) Filed: Nov. 23, 2020

(65) Prior Publication Data

US 2021/0162915 A1 Jun. 3, 2021

(30) Foreign Application Priority Data

Dec. 3, 2019 (KR) .................. 10-2019-0159270

(51) Int. Cl.
*B60Q 1/08* (2006.01)
*F21S 41/657* (2018.01)
*G06K 9/00* (2006.01)

(52) U.S. Cl.
CPC ............ *B60Q 1/085* (2013.01); *F21S 41/657* (2018.01); *G06K 9/00791* (2013.01); *G06K 9/00805* (2013.01)

(58) Field of Classification Search
CPC ...... B60Q 1/08; B60Q 1/085; B60Q 2300/32; G06K 9/00791; F21S 41/65; F21S 41/657
See application file for complete search history.

(56) References Cited

U.S. PATENT DOCUMENTS

| | | | |
|---|---|---|---|
| 9,970,752 B2 * | 5/2018 | Foltin | G01M 11/065 |
| 10,399,480 B2 * | 9/2019 | Kim | B60Q 1/24 |
| 2015/0073654 A1 * | 3/2015 | Foltin | B60Q 1/085 |
| | | | 701/36 |

FOREIGN PATENT DOCUMENTS

KR 10-2019-0016203 A 2/2019

* cited by examiner

*Primary Examiner* — Robert J May
(74) *Attorney, Agent, or Firm* — NovoTechIP International PLLC (57) ABSTRACT

The present disclosure relates to a headlamp leveling system. The headlamp leveling system includes a leveling controller that generates a control code based on information on a location of a speed bump, information on a current location of a vehicle, and information on a vertical level of a rear surface of the vehicle, and a headlamp leveling device for changing a light irradiation angle of a headlamp to a light irradiation angle corresponding to a code value of the control code.

15 Claims, 6 Drawing Sheets

HEADLAMP LEVELLING SYSTEM HAVING A CONTROLLER GENERATING A CONTROL CODE BASED ON A SPEEDBUMP LOCATION, VEHICLE LOCATION AND VEHICLE SURFACE HEIGHT

CROSS-REFERENCE TO RELATED APPLICATION

This application claims the benefit of priority to Korean Patent Application No. 10-2019-0159270, filed in the Korean Intellectual Property Office on Dec. 3, 2019, the entire contents of which are incorporated herein by reference.

TECHNICAL FIELD

The present disclosure relates to a headlamp leveling system.

BACKGROUND

There are various factors in a change in a dynamic of a vehicle. Representatively, there are cargo loading, accelerated/decelerated travel, speed bump travel, and the like. Among these, in a case of the speed bump travel, when the vehicle crosses the speed bump, there are frequent situations in which the vehicle tilts upwards, causing glare to preceding and opposing vehicles.

The vehicle includes a control system that automatically corrects an angle of a reflector of a headlamp using a vehicle height sensor on a rear surface of the vehicle to keep a light irradiation angle of the headlamp constant even when the dynamic of the vehicle changes.

To prevent the situation in which the vehicle tilts upward when crossing the speed bump, causing the glare to the preceding and opposing vehicles, the vehicle may include a control system that automatically corrects the angle of the reflector of the headlamp.

However, because the control system adjusts the angle of the reflector of the headlamp by determining an inclination of the vehicle only with the vehicle height sensor disposed on the vehicle, when the vehicle crosses the speed bump, there is a problem in that the angle of the reflector of the headlamp is adjusted after causing the glare to the preceding and opposing vehicles.

SUMMARY

The present disclosure has been made to solve the above-mentioned problems occurring in the prior art while advantages achieved by the prior art are maintained intact.

An aspect of the present disclosure provides a headlamp leveling system that prevents glare to preceding and opposing vehicles when a vehicle is traveling on a road with a speed bump.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a headlamp leveling system includes a leveling controller that generates a control code based on information on a location of a speed bump, information on a current location of a vehicle, and information on a vertical level of a rear surface of the vehicle, and a headlamp leveling device for changing a light irradiation angle of a headlamp to a light irradiation angle corresponding to a code value of the control code.

According to another aspect of the present disclosure, a headlamp leveling system includes a leveling controller that generates a preliminary control code based on information on a location of a speed bump and information on a current location of a vehicle, calculates the preliminary control code and a storage code based on information on a vertical level of a front surface of the vehicle, outputs a calculation result as a control code, and initializes the control code based on information on a vertical level of a rear surface of the vehicle, and a headlamp leveling device for changing a light irradiation angle of a headlamp to a light irradiation angle corresponding to a code value of the control code.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 6.

Figure 1:
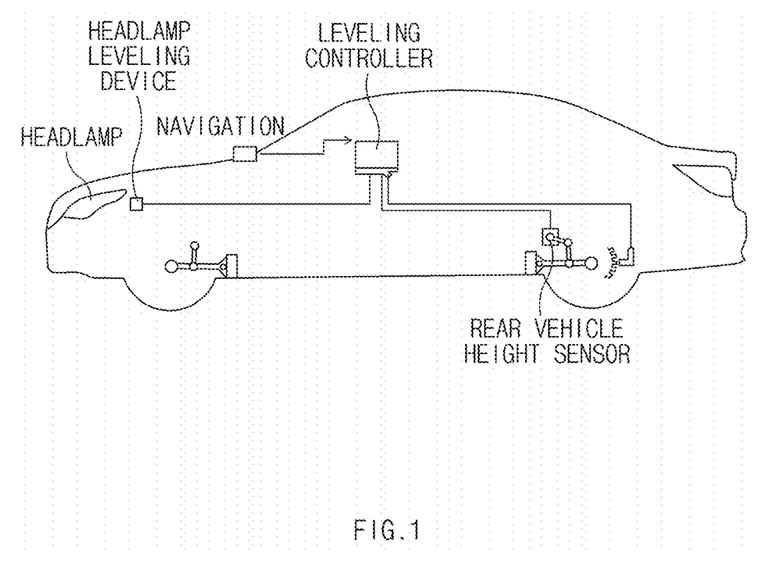
FIG. 1 is a view illustrating a configuration of a vehicle including a headlamp leveling system according to an embodiment of the present disclosure.

FIG. 1 is a view illustrating a configuration of a vehicle including a headlamp leveling system according to an embodiment of the present disclosure.

Referring to FIG. 1, a headlamp leveling system according to an embodiment of the present disclosure may be implemented inside a vehicle. In this connection, a leveling controller of the vehicle may be integrally formed with internal control units of the vehicle not shown in FIG. 1, or may be implemented as a separate device and connected to the control units of the vehicle by separate connecting means.

A navigation may refer to a device or a program that informs a route to a destination through map guidance by identifying a current location of the vehicle using a global positioning system (GPS) signal based on a numerical map produced by actual measurement or map data created based on an image from a satellite.

In this connection, the numerical map or the map data may include a location of a speed bump. Therefore, the navigation may provide information on the location of the speed bump located on the route to the destination and the current location of the vehicle.

A headlamp may include a lamp that illuminates a region ahead of the vehicle such that the vehicle may travel safely at night.

A headlamp leveling device may be a device capable of mechanically adjusting a light irradiation angle of the headlamp.

For example, the headlamp leveling device may control a light irradiation distance of the headlamp by adjusting the light irradiation angle of the headlamp. As the light irradiation angle of the headlamp decreases, the light irradiation distance of the headlamp may decrease, and as the light irradiation angle of the headlamp increases, the light irradiation distance of the headlamp may increase.

A rear vehicle height sensor may include a device and a circuit that are arranged on a rear surface of the vehicle to sense a vertical level of the rear surface of the vehicle and output a sensing result as an electrical signal.

For example, the rear vehicle height sensor may increase or decrease a voltage or a current of the electrical signal output based on increase or decrease in the vertical level of the rear surface of the vehicle.

The leveling controller may receive the information on the location of the speed bump and the current location of the vehicle from the navigation, and may receive information on the vertical level of the rear surface of the vehicle from the rear vehicle height sensor.

In addition, the leveling controller may control the light irradiation angle of the headlamp by providing an electric signal generated based on the information on the location of the speed bump, the current location of the vehicle, and the vertical level of the rear surface of the vehicle to the headlamp leveling device.

A configuration of the headlamp leveling system according to an embodiment of the present disclosure will be described in more detail with reference to FIG. 2 as follows.

Figure 2:
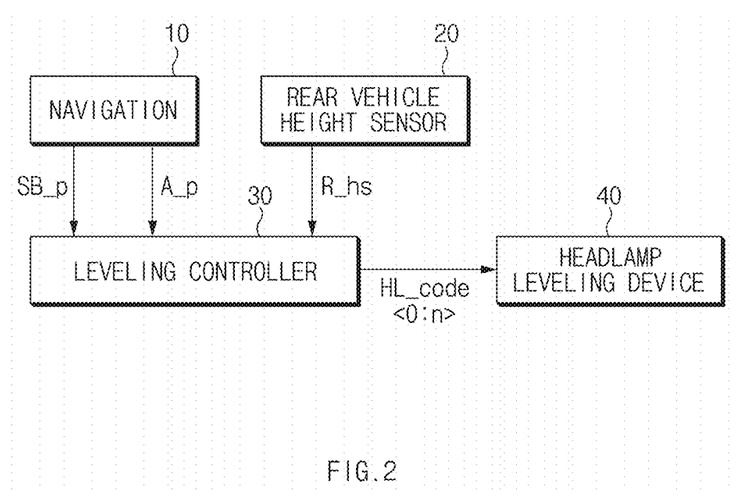
FIG. 2 is a view illustrating a configuration of a headlamp leveling system according to an embodiment of the present disclosure.

FIG. 2 is a view illustrating a configuration of a headlamp leveling system according to an embodiment of the present disclosure.

Referring to FIG. 2, the headlamp leveling system according to an embodiment of the present disclosure may include a navigation 10, a rear vehicle height sensor 20, a leveling controller 30, and a headlamp leveling device 40.

In this connection, the headlamp leveling device 40 may be connected to the headlamp as described in FIG. 1 to control the light irradiation angle of the headlamp.

In addition, the navigation 10, the rear vehicle height sensor 20, the leveling controller 30, and the headlamp leveling device 40 may be connected to each other through a vehicle network communication. Vehicle network communication technologies may include a controller area network (CAN) communication, a local interconnect network (LIN) communication, a Flex-Ray communication, an Ethernet, and the like.

The navigation 10 may provide speed bump location information SB_p and vehicle current location information A_p to the leveling controller 30.

The rear vehicle height sensor 20 may provide vehicle rear surface vertical level information R_hs to the leveling controller 30.

The leveling controller 30 may create a control code HL_code<0:n> based on the speed bump location information SB_p, the vehicle current location information A_p, and the vehicle rear surface vertical level information R_hs.

For example, the leveling controller 30 may calculate a distance between the speed bump and a current vehicle based on the speed bump location information SB_p and the vehicle current location information A_p.

When the distance between the speed bump and the current vehicle is less than a preset distance, the leveling controller 30 may increase or decrease a code value of the control code HL_code<0:n> based on the distance between the speed bump and the current vehicle.

In addition, when the distance between the speed bump and the current vehicle is equal to or less than the preset distance, the leveling controller 30 may generate an electrical signal in which a value of a voltage or a current increases or decreases based on the distance between the speed bump and the current vehicle.

The leveling controller 30 of the headlamp leveling system according to an embodiment of the present disclosure only discloses the control code HL_code<0:n> whose code value is variable based on the distance between the speed bump and the current vehicle as an embodiment, but is not limited thereto.

In addition, when the distance between the speed bump and the current vehicle is equal to or less than the preset distance, the headlamp leveling system according to an embodiment of the present disclosure may decrease the code value of the control code HL_code<0:n> as the distance between the speed bump and the current vehicle decreases.

The leveling controller 30 may initialize the control code HL_code<0:n> whose code value is decreased as the distance between the speed bump and the current vehicle decreases within the preset distance based on the vehicle rear surface vertical level information R_hs.

That is, when the distance between the speed bump and the current vehicle is equal to or less than the preset distance, the leveling controller 30 may decrease the code value of the control code HL_code<0:n> as the distance between the speed bump and the current vehicle decreases. Further, when the current vehicle crosses the speed bump, the leveling controller 30 may restore the code value of the control code HL_code<0:n> to a code value of the control code HL_code<0:n> of when the vehicle travels at a distance greater than the preset distance from the speed bump.

The leveling controller 30 may determine that the current vehicle has crossed the speed bump based on the vehicle rear surface vertical level information R_hs.

That is, when the vertical level of the rear surface of the vehicle increases to be equal to or above a preset vertical level and then returns to a vertical level before increasing, the leveling controller 30 may determine that the vehicle has crossed the speed bump based on the vehicle rear surface vertical level information R_hs.

Eventually, the headlamp leveling system according to an embodiment of the present disclosure may decrease the code value of the control code HL_code<0:n> as the distance between the speed bump and the current vehicle decreases based on the speed bump location information SB_p and the vehicle current location information A_p provided from navigation 10 when the distance between the speed bump and the current vehicle is equal to or less than the preset distance. Further, the headlamp leveling system may determine that the vehicle has crossed the speed bump and restore the code value of the control code HL_code<0:n> to the code value of the control code HL_code<0:n> of when the vehicle travels at the distance greater than the preset distance from the speed bump based on the vehicle rear surface vertical level information R_hs when the vertical level of the rear surface of the vehicle increases to be equal to or above the preset vertical level and then returns to the vertical level before increasing.

The headlamp leveling device 40 may adjust the light irradiation angle of the headlamp based on the code value of the control code HL_code<0:n> provided from the leveling controller 30.

For example, the headlamp leveling device 40 may decrease the light irradiation angle of the headlamp as the code value of the control code HL_code<0:n> decreases, and may increase the light irradiation angle of the headlamp as the code value of the control code HL_code<0:n> increases.

Figure 3:
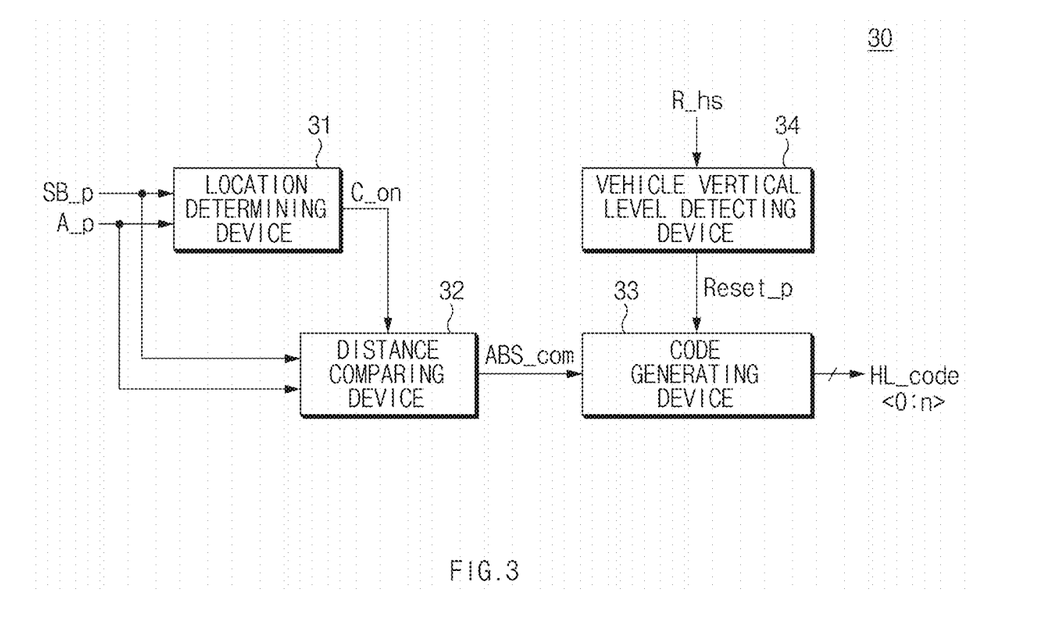
FIG. 3 is a view illustrating a leveling controller of a headlamp leveling system according to an embodiment of the present disclosure.

FIG. 3 is a view illustrating a leveling controller of a headlamp leveling system according to an embodiment of the present disclosure.

A configuration of the leveling controller 30 will be described with reference to FIG. 3 as follows.

Referring to FIG. 3, the leveling controller 30 may include a location determining device 31, a distance comparing device 32, a code generating device 33, and a vehicle vertical level detecting device 34.

The location determining device 31 may generate a distance comparison activation signal C_on based on the speed bump location information SB_p and the vehicle current location information A_p provided from the navigation 10.

For example, the location determining device 31 may enable the distance comparison activation signal C_on when the distance between the speed bump and the current vehicle becomes smaller than the preset distance based on the speed bump location information SB_p and the vehicle current location information A_p.

In one example, the location determining device 31 may disable the distance comparison activation signal C_on when the distance between the speed bump and the current vehicle is larger than the preset distance based on the speed bump location information SB_p and the vehicle current location information A_p.

The distance comparing device 32 may receive the speed bump location information SB_p and the vehicle current location information A_p provided from the navigation 10, and receive the distance comparison activation signal C_on from the location determining device 31 to generate a distance comparison result signal ABS_com.

For example, when the distance comparison activation signal C_on disabled by the location determining device 31 is provided, the distance comparing device 32 may keep a voltage level of the distance comparison result signal ABS_com constant regardless of the speed bump location information SB_p and the vehicle current location information A_p.

In one example, when the distance comparison activation signal C_on enabled by the location determining device 31 is provided, the distance comparing device 32 may vary the voltage level of the distance comparison result signal ABS_com based on the distance between the speed bump and the vehicle based on the speed bump location information SB_p and the vehicle current location information A_p.

For example, when the enabled distance comparison activation signal C_on is provided, the distance comparing device 32 may increase the voltage level of the distance comparison result signal ABS_com as the distance between the speed bump and the vehicle decreases.

The distance comparing device 32 according to an embodiment of the present disclosure describes a configuration in which the voltage level of the distance comparison result signal ABS_com is increased as the distance between the speed bump and the vehicle decreases. In another embodiment, the distance comparing device 32 may be configured to lower the voltage level of the distance comparison result signal ABS_com as the distance between the speed bump and the vehicle decreases.

The code generating device 33 may generate the control code HL_code<0:n> based on the distance comparison result signal ABS_com provided from the distance comparing device 32 and a reset pulse Reset_p provided from the vehicle vertical level detecting device 34.

For example, the code generating device 33 may decrease the code value of the control code HL_code<0:n> as the voltage level of the distance comparison result signal ABS_com increases, and may initialize the code value of the control code HL_code<0:n> when the reset pulse Reset_p is input.

The vehicle vertical level detecting device 34 may receive the vehicle rear surface vertical level information R_hs from the rear vehicle height sensor 20 and output the reset pulse Reset_p.

For example, when the vertical level of the rear surface of the vehicle increases to be equal to or above the preset vertical level and then returns to the vertical level before increasing based on the vehicle rear surface vertical level information R_hs, the vehicle vertical level detecting device 34 may generate the reset pulse Reset_p.

That is, when the vehicle rear surface vertical level information R_hs increases to be equal to or above the preset vertical level and then returns to the vertical level before increasing, the vehicle vertical level detecting device 34 may determine that the vehicle has crossed the speed bump and generate the reset pulse Reset_p.

The headlamp leveling system according to an embodiment of the present disclosure configured as described above may operate as follows.

The leveling controller 30 may receive the speed bump location information SB_p and the vehicle current location information A_p from the navigation 10, and receive the vehicle rear surface vertical level information R_hs from the rear vehicle height sensor 20.

When the distance between the speed bump and the vehicle is equal to or less than the preset distance, the leveling controller 30 received the speed bump location information SB_p and the vehicle current location information A_p may decrease the code value of the control code HL_code<0:n> as the distance between the speed bump and the vehicle decreases.

In this connection, as the code value of the control code HL_code<0:n> decreases, the headlamp leveling device 40 may decrease the light irradiation angle of the headlamp.

In addition, when the vehicle has crossed the speed bump, that is, when the vertical level of the rear surface of the vehicle increases to be equal to or above the preset vertical level and then returns to the vertical level before increasing based on the vehicle rear surface vertical level information R_hs from the rear vehicle height sensor 20, the code value of the control code HL_code<0:n> may be initialized.

When the code value of the control code HL_code<0:n> is initialized, the headlamp leveling device 40 may restore the light irradiation angle of the headlamp to a light irradiation angle of when the vehicle travels at the distance greater than the preset distance from the speed bump.

An operation of the headlamp leveling system according to an embodiment of the present disclosure will be described in detail with reference to FIG. 3 that illustrates a configuration of the leveling controller 30 as follows.

In this connection, it is assumed that the control code HL_code<0:n> is a 4-bit code HL_code<0:3>, and is able to have a code value of (1, 0, 0, 0) as an initial value when the vehicle travels on a route without the speed bump.

Therefore, when the vehicle travels on the route without the speed bump, the headlamp leveling device 40 may maintain the light irradiation angle of the headlamp constant to correspond to the control code HL_code<0:3> value of (1, 0, 0, 0).

The location determining device 31 may receive the speed bump location information SB_p and the vehicle current location information A_p from the navigation 10 to enable the distance comparison activation signal C_on when the distance between the speed bump and the vehicle is equal to or less than the preset distance.

When the distance comparison activation signal C_on enabled by the location determining device 31 is input, the distance comparing device 32 may generate the distance comparison result signal ABS_com in which the voltage level increases as the distance between the speed bump and the current vehicle decreases based on the speed bump location information SB_p and the vehicle current location information A_p.

The code generating device 33 may reduce the code value of the control code HL_code<0:3> as the voltage level of the distance comparison result signal ABS_com increases. That is, as the voltage level of the distance comparison result signal ABS_com increases, the code generating device 33 may decrease the code value of the control code HL_code<0:3>, which is the code value of (1, 0, 0, 0).

When the code value of the control code HL_code<0:3> output from the code generating device 33 is reduced, the headlamp leveling device 40 may reduce the light irradiation angle of the headlamp.

When the vehicle has crossed the speed bump, that is, when the vertical level of the rear surface of the vehicle increases to be equal to or above the preset vertical level and then returns to the vertical level before increasing based on the vehicle rear surface vertical level information R_hs, the vehicle vertical level detecting device 34 may generate the reset pulse Reset_p.

The code generating device 33 may restore the control code HL_code<0:3> with the reduced code value to the initial value (1, 0, 0, 0) when the reset pulse Reset_p is input.

The headlamp leveling device 40 may restore the light irradiation angle of the headlamp to the light irradiation angle of when traveling on the route without the speed bump.

Eventually, when there is the speed bump on the traveling route, and when the distance between the speed bump and the vehicle decreases to be equal to or less than the preset distance, the headlamp leveling system according to an embodiment of the present disclosure may decrease the light irradiation angle of the headlamp by the reduced distance. Further, when it is determined that the vehicle has crossed the speed bump, the headlamp leveling system may restore the light irradiation angle of the headlamp to the light irradiation angle of when traveling on the road without the speed bump.

Therefore, because the headlamp leveling system according to an embodiment of the present disclosure decreases the light irradiation angle of the headlamp as the distance between the speed bump and the vehicle decreases, the light irradiation angle of the headlamp may be decreased in advance before a front wheel of the vehicle moves onto the speed bump. Thus, a problem in which the light irradiated from the headlamp causes glare to an opposite vehicle or a preceding vehicle as a vertical level of a front surface of the vehicle increases when the front wheel of the vehicle moves onto the speed bump may be eliminated.

Figure 4:
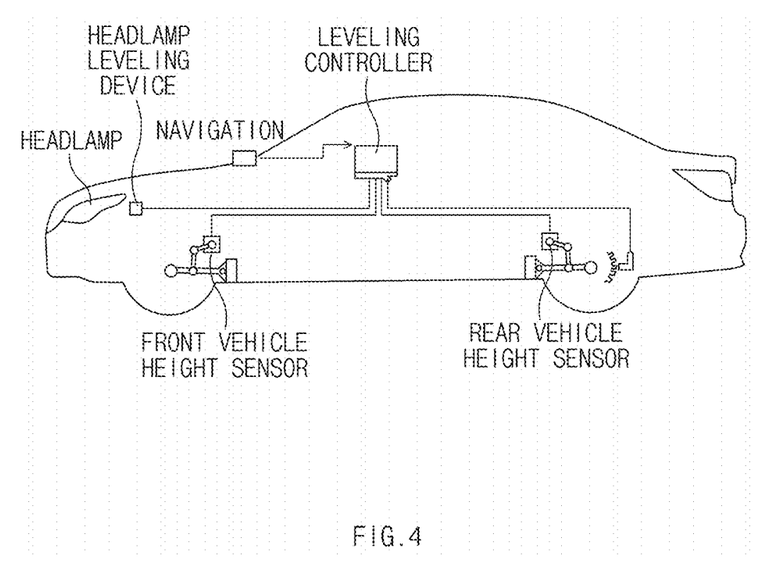
FIG. 4 is a view illustrating a configuration of a vehicle including a headlamp leveling system according to another embodiment of the present disclosure.

FIG. 4 is a view illustrating a configuration of a vehicle including a headlamp leveling system according to another embodiment of the present disclosure.

Referring to FIG. 4, a headlamp leveling system according to another embodiment of the present disclosure may be implemented inside the vehicle. In this connection, the vehicle leveling controller may be integrally formed with internal control units of the vehicle not shown in FIG. 4, or may be implemented as a separate device and connected to the control units of the vehicle by separate connecting means.

The navigation may refer to the device or the program that informs the route to the destination through the map guidance by identifying the current location of the vehicle using the global positioning system (GPS) signal based on the numerical map produced by the actual measurement or the map data created based on the image from the satellite.

In this connection, the numerical map or the map data may include the location of the speed bump. Therefore, the navigation may provide the information on the location of the speed bump located on the route to the destination and the current location of the vehicle.

The headlamp may include the lamp that illuminates the region ahead of the vehicle such that the vehicle may travel safely at night.

The headlamp leveling device may be the device capable of mechanically adjusting the light irradiation angle of the headlamp.

For example, the headlamp leveling device may control the light irradiation distance of the headlamp by adjusting the light irradiation angle of the headlamp. As the light irradiation angle of the headlamp decreases, the light irradiation distance of the headlamp may decrease, and as the light irradiation angle of the headlamp increases, the light irradiation distance of the headlamp may increase.

A front vehicle height sensor may include a device and a circuit that are arranged on the front surface of the vehicle to sense the vertical level of the front surface of the vehicle and output a sensing result as an electrical signal.

For example, the front vehicle height sensor may increase or decrease a voltage or a current of the electrical signal output based on increase or decrease in the vertical level of the front surface of the vehicle.

The rear vehicle height sensor may include the device and the circuit that are arranged on the rear surface of the vehicle to sense the vertical level of the rear surface of the vehicle and output the sensing result as the electrical signal.

For example, the rear vehicle height sensor may increase or decrease the voltage or the current of the electrical signal output based on the increase or decrease in the vertical level of the rear surface of the vehicle.

The leveling controller may receive the information on the location of the speed bump and the current location of the vehicle from the navigation, and may receive information on the vertical levels of the front surface and the rear surface of the vehicle from the front vehicle height sensor and the rear vehicle height sensor.

In addition, the leveling controller may control the light irradiation angle of the headlamp by providing an electric signal generated based on the information on the location of the speed bump, the current location of the vehicle, and the vertical levels of the front surface and the rear surface of the vehicle to the headlamp leveling device.

A configuration of the headlamp leveling system according to another embodiment of the present disclosure will be described in more detail with reference to FIG. 5 as follows.

Figure 5:
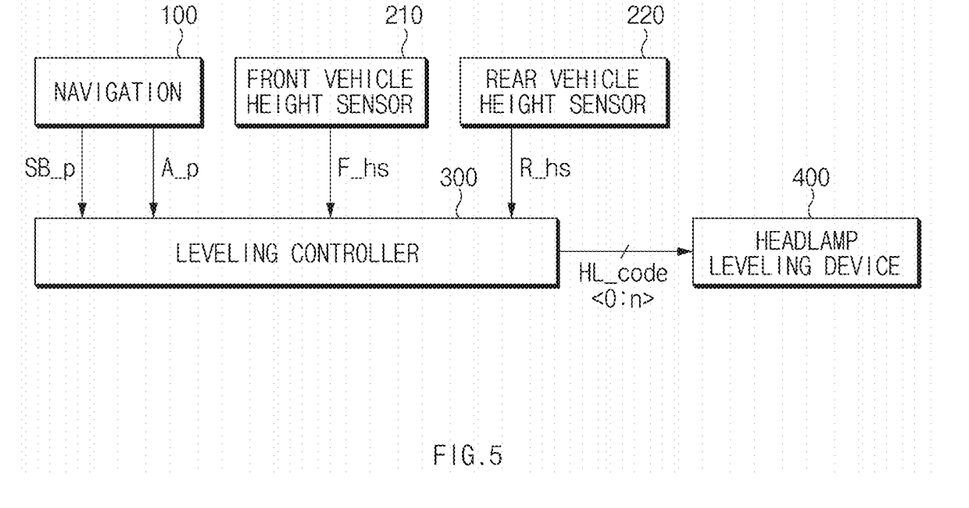
FIG. 5 is a view illustrating a configuration of a headlamp leveling system according to another embodiment of the present disclosure.

FIG. 5 is a view illustrating a configuration of a headlamp leveling system according to another embodiment of the present disclosure.

Referring to FIG. 5, the headlamp leveling system according to another embodiment of the present disclosure may include a navigation 100, a front vehicle height sensor 210, a rear vehicle height sensor 220, a leveling controller 300, and a headlamp leveling device 400.

In this connection, the headlamp leveling device 400 may be connected to the headlamp as described in FIG. 4 to control the light irradiation angle of the headlamp.

In addition, the navigation 100, the front vehicle height sensor 210, the rear vehicle height sensor 220, the leveling controller 300, and the headlamp leveling device 400 may be connected to each other through the vehicle network communication. The vehicle network communication technologies may include the controller area network (CAN) communication, the local interconnect network (LIN) communication, the Flex-Ray communication, the Ethernet, and the like.

The navigation 100 may provide the speed bump location information SB_p and the vehicle current location information A_p to the leveling controller 300.

The front vehicle height sensor 210 may provide vehicle front surface vertical level information F_hs to the leveling controller 300.

The rear vehicle height sensor 220 may provide the vehicle rear surface vertical level information R_hs to the leveling controller 300.

The leveling controller 300 may create the control code HL_code<0:n> based on the speed bump location information SB_p, the vehicle current location information A_p, the vehicle front surface vertical level information F_hs, and the vehicle rear surface vertical level information R_hs.

For example, the leveling controller 300 may calculate the distance between the speed bump and the current vehicle based on the speed bump location information SB_p and the vehicle current location information A_p.

When the distance between the speed bump and the current vehicle is equal to or less than the preset distance, the leveling controller 300 may increase or decrease the code value of the control code HL_code<0:n> based on the distance between the speed bump and the current vehicle.

In addition, when the distance between the speed bump and the current vehicle is equal to or less than the preset distance, the leveling controller 300 may generate the electrical signal in which the value of the voltage or the current increases or decreases based on the distance between the speed bump and the current vehicle.

The leveling controller 300 of the headlamp leveling system according to another embodiment of the present disclosure only discloses the control code HL_code<0:n> whose code value is variable based on the distance between the speed bump and the current vehicle as an embodiment, but is not limited thereto.

In addition, when the distance between the speed bump and the current vehicle is equal to or less than the preset distance, the headlamp leveling system according to another embodiment of the present disclosure may decrease the code value of the control code HL_code<0:n> as the distance between the speed bump and the current vehicle decreases.

The leveling controller 300 may further reduce, based on the vehicle front surface vertical level information F_hs, the control code HL_code<0:n> whose code value is reduced as the distance between the speed bump and the current vehicle is decreased when the distance between the speed bump and the current vehicle is equal to or less than the preset distance.

That is, when the front wheel of the vehicle is placed on the speed bump and then the vertical level of the front surface of the vehicle is equal to or above the preset vertical level, the leveling controller 300 may further reduce the code value of the control code HL_code<0:n>.

The leveling controller 300 may initialize the control code HL_code<0:n> whose code value is further reduced based on the vehicle rear surface vertical level information R_hs.

That is, when the distance between the speed bump and the current vehicle is within the preset distance, the leveling controller 300 may decrease the code value of the control code HL_code<0:n> as the distance between the speed bump and the current vehicle decreases. Further, when the current vehicle crosses the speed bump (when a vertical level of a rear wheel of the vehicle is increased to be equal to or above a preset vertical level), the leveling controller 300 may restore the code value of the control code HL_code<0:n> to the code value of the control code HL_code<0:n> of when the vehicle travels at the distance greater than the preset distance from the speed bump.

Eventually, the headlamp leveling system according to another embodiment of the present disclosure may decrease the code value of the control code HL_code<0:n> as the distance between the speed bump and the current vehicle decreases based on the speed bump location information SB_p and the vehicle current location information A_p provided from navigation 100 when the distance between the speed bump and the current vehicle is within the preset distance. Further, when the vertical level of the front surface of the vehicle is increased to be equal to or greater than the preset vertical level based on the vehicle front surface vertical level information, the headlamp leveling system according to another embodiment of the present disclosure may determine that the front wheel of the vehicle is crossing the speed bump, and further reduce the code value of the control code HL_code<0:n>. When the vertical level of the rear surface of the vehicle increases to be equal to or above the preset vertical level and then returns to the vertical level before increasing based on the vehicle rear surface vertical level information R_hs, the headlamp leveling system may determine that the vehicle has crossed the speed bump, and restore the code value of the control code HL_code<0:n> to the code value of the control code HL_code<0:n> of when the vehicle travels at the distance greater than the preset distance from the speed bump.

The headlamp leveling device 400 may adjust the light irradiation angle of the headlamp based on the code value of the control code HL_code<0:n> provided from the leveling controller 300.

For example, the headlamp leveling device 400 may decrease the light irradiation angle of the headlamp as the code value of the control code HL_code<0:n> decreases, and may increase the light irradiation angle of the headlamp as the code value of the control code HL_code<0:n> increases.

Figure 6:
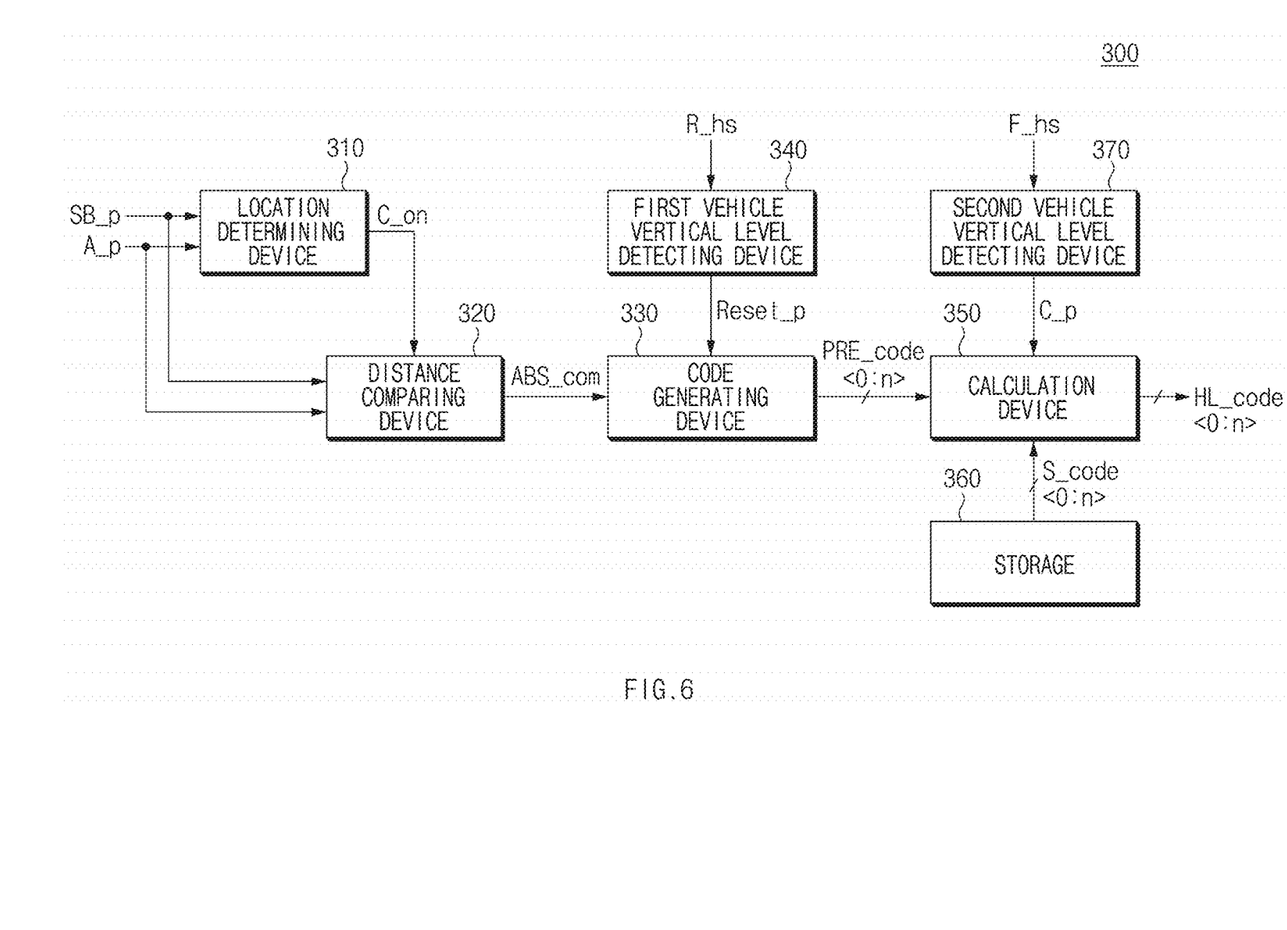
FIG. 6 is a view illustrating a leveling controller of a headlamp leveling system according to another embodiment of the present disclosure.

FIG. 6 is a view illustrating a leveling controller of a headlamp leveling system according to another embodiment of the present disclosure.

A configuration of the leveling controller 300 will be described with reference to FIG. 6 as follows.

Referring to FIG. 6, the leveling controller 300 may include a location determining device 310, a distance comparing device 320, a code generating device 330, a first vehicle vertical level detecting device 340, a calculation device 350, storage 360, and a second vehicle vertical level detecting device 370.

The location determining device 310 may generate the distance comparison activation signal C_on based on the speed bump location information SB_p and the vehicle current location information A_p provided from the navigation 100.

For example, the location determining device 310 may enable the distance comparison activation signal C_on when the distance between the speed bump and the current vehicle becomes smaller than the preset distance based on the speed bump location information SB_p and the vehicle current location information A_p.

In one example, the location determining device 310 may disable the distance comparison activation signal C_on when the distance between the speed bump and the current vehicle is larger than the preset distance based on the speed bump location information SB_p and the vehicle current location information A_p.

The distance comparing device 320 may receive the speed bump location information SB_p and the vehicle current location information A_p provided from the navigation 100, and receive the distance comparison activation signal C_on from the location determining device 310 to generate the distance comparison result signal ABS_com.

For example, when the distance comparison activation signal C_on disabled by the location determining device 310 is provided, the distance comparing device 320 may keep the voltage level of the distance comparison result signal ABS_com constant regardless of the speed bump location information SB_p and the vehicle current location information A_p.

In one example, when the distance comparison activation signal C_on enabled by the location determining device 310 is provided, the distance comparing device 320 may vary the voltage level of the distance comparison result signal ABS_com based on the distance between the speed bump and the vehicle based on the speed bump location information SB_p and the vehicle current location information A_p.

For example, when the enabled distance comparison activation signal C_on is provided, the distance comparing device 320 may increase the voltage level of the distance comparison result signal ABS_com as the distance between the speed bump and the vehicle decreases.

The distance comparing device 320 according to an embodiment of the present disclosure describes a configuration in which the voltage level of the distance comparison result signal ABS_com is increased as the distance between the speed bump and the vehicle decreases. In another embodiment, the distance comparing device 320 may be configured to lower the voltage level of the distance comparison result signal ABS_com as the distance between the speed bump and the vehicle decreases.

The code generating device 330 may generate a preliminary control code PRE_code<0:n> based on the distance comparison result signal ABS_com provided from the distance comparing device 320 and the reset pulse Reset_p provided from the first vehicle vertical level detecting device 340.

For example, the code generating device 330 may decrease the code value of the preliminary control code PRE_code<0:n> as the voltage level of the distance comparison result signal ABS_com increases, and may initialize the code value of the preliminary control code PRE_code<0:n> when the reset pulse Reset_p is input.

The first vehicle vertical level detecting device 340 may receive the vehicle rear surface vertical level information R_hs from the rear vehicle height sensor 220 and output the reset pulse Reset_p.

For example, when the vertical level of the rear surface of the vehicle increases to be equal to or above the preset vertical level and then returns to the vertical level before increasing based on the vehicle rear surface vertical level information R_hs, the vehicle vertical level detecting device 340 may generate the reset pulse Reset_p.

That is, when the vertical level of the rear surface of the vehicle increases to be equal to or above the preset vertical level and then returns to the vertical level before increasing, the first vehicle vertical level detecting device 340 may determine that the vehicle has crossed the speed bump and generate the reset pulse Reset_p.

The calculation device 350 may receive the preliminary control code PRE_code<0:n> provided from the code generating device 330, receive a storage code S_code<0:n> from the storage 360, and receive a calculation pulse C_p from the second vehicle vertical level detecting device 370 to output the control code HL_code<0:n>.

For example, when the calculation pulse C_p is input, the calculation device 350 may calculate the preliminary control code PRE_code<0:n> and the storage code S_code<0:n> during a preset time, and output a calculation result as the control code HL_code<0:n>.

For example, when the calculation pulse C_p is input, the calculation device 350 may perform a subtraction operation on the preliminary control code PRE_code<0:n> and the storage code S_code<0:n> during a preset time, and output a subtraction operation result as the control code HL_code<0:n>.

In one example, before the calculation pulse C_p is input and when a preset time elapses after the calculation pulse C_p is input, the calculation device 350 may output the preliminary control code PRE_code<0:n> as the control code HL_code<0:n>.

The storage 360 may store a code value set by a user or a designer, and output the stored code as the storage code S_code<0:n>.

The second vehicle vertical level detecting device 370 may generate the calculation pulse C_p when the vertical level of the front surface of the vehicle increases to be equal to or greater than the preset vertical level based on the vehicle front surface vertical level information F_hs.

That is, when the vertical level of the front surface of the vehicle increases to be equal to or above the preset vertical level based on the vehicle front surface vertical level information F_hs, the second vehicle vertical level detecting device 370 may determine that the front wheel of the vehicle is moving onto the speed bump and generate the calculation pulse C_p.

The headlamp leveling system according to another embodiment of the present disclosure configured as described above may operate as follows.

The leveling controller 300 may receive the speed bump location information SB_p and the vehicle current location information A_p from the navigation 100, and receive the vehicle front surface vertical level information F_hs and the vehicle rear surface vertical level information R_hs from the front vehicle height sensor 210 and the rear vehicle height sensor 220.

When the distance between the speed bump and the vehicle is less than the preset distance, the leveling controller 300 received the speed bump location information SB_p and the vehicle current location information A_p may decrease the code value of the control code HL_code<0:n> as the distance between the speed bump and the vehicle decreases.

In this connection, as the code value of the control code HL_code<0:n> decreases, the headlamp leveling device 400 may decrease the light irradiation angle of the headlamp.

When the front wheel of the vehicle moves onto the speed bump, that is, based on the vehicle front surface vertical level information F_hs from the front vehicle height sensor 210, the code value of the control code HL_code<0:n> may be further reduced.

In this connection, the code value of the control code HL_code<0:n> is further reduced, so that the light irradiation angle of the headlamp may be further reduced.

In addition, when the vehicle has crossed the speed bump, that is, when the vertical level of the rear surface of the vehicle increases to be equal to or above the preset vertical level and then returns to the vertical level before increasing based on the vehicle rear surface vertical level information R_hs from the rear vehicle height sensor 220, the code value of the control code HL_code<0:n> may be initialized.

When the code value of the control code HL_code<0:n> is initialized, the headlamp leveling device 400 may restore the light irradiation angle of the headlamp to a light irradiation angle of when the vehicle travels at the distance greater than the preset distance from the speed bump.

An operation of the headlamp leveling system according to another embodiment of the present disclosure will be described in detail with reference to FIG. 6 that illustrates a configuration of the leveling controller 300 as follows.

In this connection, it is assumed that the preliminary control code PRE_code<0:n> is a 4-bit code PRE_code<0:3>, and is able to have a code value of (1, 0, 0, 0) as an initial value when the vehicle travels on the route without the speed bump.

Therefore, when the vehicle travels on the route without the speed bump, the headlamp leveling device 400 may maintain the light irradiation angle of the headlamp constant to correspond to the control code HL_code<0:3> value of (1, 0, 0, 0).

The location determining device 310 may receive the speed bump location information SB_p and the vehicle current location information A_p from the navigation 100 to enable the distance comparison activation signal C_on when the distance between the speed bump and the vehicle is equal to or less than the preset distance.

When the distance comparison activation signal C_on enabled by the location determining device 310 is input, the distance comparing device 320 may generate the distance comparison result signal ABS_com in which the voltage level increases as the distance between the speed bump and the current vehicle decreases based on the speed bump location information SB_p and the vehicle current location information A_p.

The code generating device 330 may reduce the code value of the preliminary control code PRE_code<0:3> as the voltage level of the distance comparison result signal ABS_com increases. That is, as the voltage level of the distance comparison result signal ABS_com increases, the code generating device 330 may decrease the code value of the preliminary control code PRE_code<0:3>, which is the code value of (1, 0, 0, 0).

The preliminary control code PRE_code<0:3> output from the code generating device 330 may be provided to the calculation device 350, and the calculation device 350 may output the preliminary control code PRE_code<0:3> as the control code HL_code<0:3>.

Thus, when the code value of the preliminary control code PRE_code<0:3> output from the code generating device 330 is reduced, the headlamp leveling device 400 may reduce the light irradiation angle of the headlamp.

When the vertical level of the front surface of the vehicle increases to be equal to or above the preset vertical level based on the vehicle front surface vertical level information F_hs, the second vehicle vertical level detecting device 370 may determine that the front wheel of the vehicle is moving onto the speed bump and generate the calculation pulse C_p.

When the calculation pulse C_p is provided to the calculation device 350, the calculation device 350 may subtract the storage code S_code<0:3> from the preliminary control code PRE_code<0:3> during the preset time, and output a result of the subtraction operation as the control code HL_code<0:3>.

That is, when the front wheel of the vehicle moves onto the speed bump, the code value of the control code HL_code<0:3> may be additionally reduced by the code value of the storage code S_code<0:3>.

Therefore, when the front wheel of the vehicle moves onto the speed bump, the headlamp leveling device 400 received the control code HL_code<0:3> may further reduce the light irradiation angle of the headlamp.

When the calculation pulse C_p is provided to the calculation device 350 and the preset time elapses, the calculation device 350 may output the preliminary control code PRE_code<0:3> provided from the code generating device 330 as the control code HL_code<0:3>.

When the vehicle has crossed the speed bump, that is, when the vertical level of the rear surface of the vehicle increases to be equal to or above the preset vertical level and then returns to the vertical level before increasing based on the vehicle rear surface vertical level information R_hs, the first vehicle vertical level detecting device 340 may generate the reset pulse Reset_p.

The code generating device 330 may restore the preliminary control code HL_code<0:3> with the reduced code value to the initial value (1, 0, 0, 0) when the reset pulse Reset_p is input.

The preliminary control code PRE_code<0:3> may be provided to the headlamp leveling device 400 as the control code HL_code<0:3> through the calculation device 350.

Thus, the headlamp leveling device 400 may restore the light irradiation angle of the headlamp to the light irradiation angle of when traveling on the route without the speed bump.

Eventually, when there is the speed bump on the traveling route, and when the distance between the speed bump and the vehicle decreases to be equal to or less than the preset distance, the headlamp leveling system according to another embodiment of the present disclosure may decrease the light irradiation angle of the headlamp by the reduced distance. Further, when it is determined that the vehicle has crossed the speed bump, the headlamp leveling system may restore the light irradiation angle of the headlamp to the light irradiation angle of when traveling on the road without the speed bump.

Therefore, the headlamp leveling system according to another embodiment of the present disclosure decreases the light irradiation angle of the headlamp as the distance between the speed bump and the vehicle decreases, and further decreases the light irradiation angle of the headlamp when the front wheel of the vehicle is placed on the speed bump. Thus, the problem in which the light irradiated from the headlamp causes the glare to the opposite vehicle or the preceding vehicle as the vertical level of the front surface of the vehicle increases when the front wheel of the vehicle is placed on the speed bump may be eliminated.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The present technology controls an angle of a reflector of the headlamp to correspond to the distance between the speed bump and the vehicle when the vehicle travels on the road on which the speed bump is disposed, thereby preventing the glare to the preceding and opposing vehicles when the vehicle crosses the speed bump.

In addition, various effects that are directly or indirectly identified through this document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A headlamp leveling system comprising:
   a leveling controller configured to generate a control code based on information on a location of a speed bump, information on a current location of a vehicle, and information on a vertical level of a rear surface of the vehicle; and
   a headlamp leveling device for changing a light irradiation angle of a headlamp to a light irradiation angle corresponding to a code value of the control code.

2. The headlamp leveling system of claim 1, wherein the speed bump location information and the vehicle current location information are provided from a navigation,
   wherein the vehicle rear surface vertical level information is provided from a rear vehicle height sensor.

3. The headlamp leveling system of claim 1, wherein the leveling controller is configured to increase or decrease the code value of the control code based on a distance between the speed bump and the vehicle based on the speed bump location information and the vehicle current location information when the distance between the speed bump and the vehicle is equal to or less than a preset distance.

4. The headlamp leveling system of claim 3, wherein the leveling controller is configured to reduce the code value of the control code as the distance between the speed bump and the vehicle decreases when the distance between the speed bump and the vehicle is equal to or less than the preset distance.

5. The headlamp leveling system of claim 2, wherein the leveling controller is configured to initialize, based on the vehicle rear surface vertical level information, the control code having the code value decreasing based on a distance between the speed bump and the vehicle when the distance between the speed bump and the vehicle is equal to or less than a preset distance.

6. The headlamp leveling system of claim 5, wherein the leveling controller is configured to restore the control code to a code value of when the vehicle travels on a route without the speed bump when initializing the control code based on the vehicle rear surface vertical level information.

7. The headlamp leveling system of claim 6, wherein the leveling controller is configured to determine that the vehicle has crossed the speed bump and initialize the control code based on the vehicle rear surface vertical level information when the vertical level of the rear surface of the vehicle increases to be equal to or above a preset vertical level.

8. The headlamp leveling system of claim 7, wherein the leveling controller includes:
   a location determining device for enabling a distance comparison activation signal based on the speed bump location information and the vehicle current location information when the distance between the speed bump and the current vehicle is equal to or less than the preset distance;
   a distance comparing device for generating a distance comparison result signal whose voltage level increases as the distance between the speed bump and the current vehicle decreases based on the speed bump location information and the vehicle current location information when the distance comparison activation signal is enabled;
   a vehicle vertical level detecting device for generating a reset pulse based on the vehicle rear surface vertical level information when the vertical level of the rear surface of the vehicle increases to be equal to or above the preset vertical level; and
   a code generating device for decreasing the code value of the control code as the voltage level of the distance comparison result signal increases, and initializing the control code when the reset pulse is input.

9. A headlamp leveling system comprising:
   a leveling controller configured to:
      generate a preliminary control code based on information on a location of a speed bump and information on a current location of a vehicle;
      calculate the preliminary control code and a storage code based on information on a vertical level of a front surface of the vehicle;
      output a calculation result as a control code; and
      initialize the control code based on information on a vertical level of a rear surface of the vehicle; and
   a headlamp leveling device configured to change a light irradiation angle of a headlamp to a light irradiation angle corresponding to a code value of the control code.

10. The headlamp leveling system of claim 9, wherein the leveling controller is configured to decrease a code value of the preliminary control code as a distance between the speed bump and the vehicle decreases based on the speed bump location information and the vehicle current location information when the distance between the speed bump and the vehicle is equal to or less than a preset distance.

11. The headlamp leveling system of claim 10, wherein the leveling controller is configured to:
   generate a calculation pulse based on the vehicle front surface vertical level information when the vertical level of the front surface of the vehicle increases to be equal to or above a preset vertical level; and
   perform a subtraction operation on the preliminary control code and the storage code for a preset time to generate the control code when the calculation pulse is generated.

12. The headlamp leveling system of claim 11, wherein the leveling controller is configured to output the preliminary control code as the control code before the calculation pulse is generated and when the preset time elapses after the calculation pulse is generated.

13. The headlamp leveling system of claim 12, wherein the leveling controller is configured to:
   generate a reset pulse based on the vehicle rear surface vertical level information when it is determined that the vertical level of the rear surface of the vehicle increases to be equal to or above a preset vertical level and then returns to a vertical level before increasing;
   initialize the preliminary control code when the reset pulse is generated; and
   output the initialized preliminary control code as the control code.

14. The headlamp leveling system of claim 13, wherein the leveling controller includes:
   a location determining device for enabling a distance comparison activation signal based on the speed bump location information and the vehicle current location information when the distance between the speed bump and the current vehicle is equal to or less than the preset distance;
   a distance comparing device for generating a distance comparison result signal whose voltage level increases as the distance between the speed bump and the current vehicle decreases based on the speed bump location information and the vehicle current location information when the distance comparison activation signal is enabled;
   a first vehicle vertical level detecting device for generating the reset pulse based on the vehicle rear surface vertical level information;
   a code generating device for decreasing the code value of the preliminary control code as the voltage level of the distance comparison result signal increases, and initializing the preliminary control code when the reset pulse is input;
   a second vehicle vertical level detecting device for generating the calculation pulse based on the vehicle front surface vertical level information; and
   a calculation device for performing the subtraction operation on the preliminary control code and the storage code for the preset time when the calculation pulse is input, and outputting the operation result as the control code.

15. The headlamp leveling system of claim 14, wherein the calculation device outputs the preliminary control code as the control code before the calculation pulse is input and when the preset time elapses after the calculation pulse is input.

* * * * *